US008866828B2

(12) United States Patent
Sun et al.

(10) Patent No.: US 8,866,828 B2
(45) Date of Patent: Oct. 21, 2014

(54) ENABLING DISPLAY COMMANDS FROM AN ELECTRONIC DEVICE TO AN INTEGRATED DISPLAY ON A COMPUTER SYSTEM

(75) Inventors: Adrian E. Sun, Mountain View, CA (US); Thomas A. LaPerre, Jr., San Mateo, CA (US); Collin L. Pieper, San Francisco, CA (US); Eugene I. Chen, San Jose, CA (US)

(73) Assignee: Apple Inc., Cupertino, CA (US)

( * ) Notice: Subject to any disclaimer, the term of this patent is extended or adjusted under 35 U.S.C. 154(b) by 51 days.

(21) Appl. No.: 13/286,603

(22) Filed: Nov. 1, 2011

(65) Prior Publication Data

US 2013/0106874 A1 May 2, 2013

(51) Int. Cl.
*G06T 1/00* (2006.01)
*G06F 13/14* (2006.01)

(52) U.S. Cl.
CPC .. *G06F 13/14* (2013.01); *G06T 1/00* (2013.01)
USPC ............ 345/522; 345/3.3; 345/698; 345/157; 345/163; 345/551; 345/671; 715/866; 715/839; 715/708; 715/835

(58) Field of Classification Search
USPC .......... 345/522, 3.3, 698, 157, 163, 551, 671; 715/866, 839, 708, 835
See application file for complete search history.

(56) References Cited

U.S. PATENT DOCUMENTS

| | | | |
|---|---|---|---|
| 6,346,933 B1* | 2/2002 | Lin | 345/157 |
| 7,139,529 B2* | 11/2006 | Rekimoto et al. | 455/41.3 |
| 7,215,339 B1* | 5/2007 | Dotson | 345/558 |
| 7,706,637 B2* | 4/2010 | Marriott | 382/305 |
| 8,072,392 B2* | 12/2011 | Lection | 345/1.1 |
| 2003/0167318 A1* | 9/2003 | Robbin et al. | 709/221 |
| 2006/0007051 A1* | 1/2006 | Bear et al. | 345/1.1 |
| 2006/0088228 A1* | 4/2006 | Marriott et al. | 382/305 |
| 2006/0155914 A1* | 7/2006 | Jobs et al. | 711/100 |
| 2006/0238439 A1* | 10/2006 | Fuller et al. | 345/1.1 |
| 2007/0010289 A1* | 1/2007 | Mezue | 455/557 |
| 2007/0033295 A1* | 2/2007 | Marriott | 709/248 |
| 2007/0180328 A1* | 8/2007 | Cornwell et al. | 714/42 |
| 2007/0286246 A1* | 12/2007 | Kobayashi | 370/522 |
| 2009/0002564 A1* | 1/2009 | Barnhoefer et al. | 348/687 |
| 2010/0054715 A1* | 3/2010 | Marriott et al. | 386/124 |
| 2010/0321396 A1* | 12/2010 | Xu | 345/520 |
| 2012/0005630 A1* | 1/2012 | Ohba et al. | 715/853 |
| 2012/0019493 A1* | 1/2012 | Barnhoefer et al. | 345/207 |
| 2012/0066458 A1* | 3/2012 | Chiba et al. | 711/154 |
| 2012/0108314 A1* | 5/2012 | Enzminger et al. | 463/17 |

FOREIGN PATENT DOCUMENTS

CN 1896951 A * 1/2007

* cited by examiner

*Primary Examiner* — Abderrahim Merouan
(74) *Attorney, Agent, or Firm* — Park, Vaughan, Fleming & Dowler LLP; Chia-Hsin Suen (57) ABSTRACT

The disclosed embodiments provide a system that drives an integrated display on a computer system from an electronic device. The system includes a circuit, a processor, and an application executing on the processor. The circuit may receive a display command sent from the electronic device to the computer system. The application may obtain the display command from a memory on the computer system and process the display command to control a capability of the integrated display.

23 Claims, 6 Drawing Sheets

ENABLING DISPLAY COMMANDS FROM AN ELECTRONIC DEVICE TO AN INTEGRATED DISPLAY ON A COMPUTER SYSTEM

BACKGROUND

1. Field

The present embodiments relate to techniques for driving an external display from an electronic device. More specifically, the present embodiments relate to techniques for enabling display commands from the electronic device to an integrated display on a computer system.

2. Related Art

Interactions between a user and an electronic device such as a laptop computer and/or tablet computer may be facilitated by connecting multiple displays to the electronic device. For example, the connection of an external monitor to a laptop computer may allow the user of the laptop computer to simultaneously view more documents, media files (e.g., video, images, etc.), and/or graphical user interfaces (GUIs) for applications than would be possible with just the laptop computer's built-in monitor. Furthermore, the laptop computer may include a standardized video interface such as DisplayPort, Digital Visual Interface (DVI) or High-Definition Multimedia Interface (HDMI) that allows the laptop computer to be connected to both standalone displays and integrated displays of other computer systems.

However, an integrated display on a computer system may have limited configurability when connected to an electronic device. For example, the integrated display may be driven using video and audio data from the electronic device but may not accept display commands from the electronic device for adjusting the brightness, volume, balance, muting, and/or blanking of the integrated display. In other words, the functionality of the integrated display as an external display for the electronic device may be limited.

Hence, what is needed is a mechanism for configuring an integrated display on a computer system to accept display commands from an electronic device used to drive the integrated display.

SUMMARY

The disclosed embodiments provide a system that drives an integrated display on a computer system from an electronic device. The system includes a circuit, a processor, and an application executing on the processor. The circuit may receive a display command sent from the electronic device to the computer system. The application may obtain the display command from a memory on the computer system and process the display command to control a capability of the integrated display.

In some embodiments, the system also includes a driver executing on the processor. The driver may analyze the display command for compatibility with the application. If the display command is compatible with the application, the driver may place the display command into the memory. For example, the display command may be determined to be compatible with the application if an operation code (opcode) and/or memory address in the display command are understandable by the application.

In some embodiments, placing the display command into the memory involves placing the display command into a buffer, and using direct memory access (DMA) to transfer the display command from the buffer to the memory.

In some embodiments, the application also sends a communication associated with the integrated display to the circuit through the driver, and the circuit transmits the communication to the electronic device.

In some embodiments, the communication is a response to the display command and/or an interrupt request. For example, the response may include an acknowledgement of the display command and/or data related to the display command, while the interrupt request may be used to synchronize data between the electronic device and the integrated display.

In some embodiments, the communication is generated by the application and/or the integrated display.

In some embodiments, processing the display command to control the capability of the integrated display involves at least one of forwarding the display command to the integrated display, and generating a response to the display command.

In some embodiments, the display command corresponds to at least one of a start command, a write command, a read command, and a stop command.

In some embodiments, the capability of the integrated display is at least one of a brightness, a volume, a balance, a muting, and a blanking

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
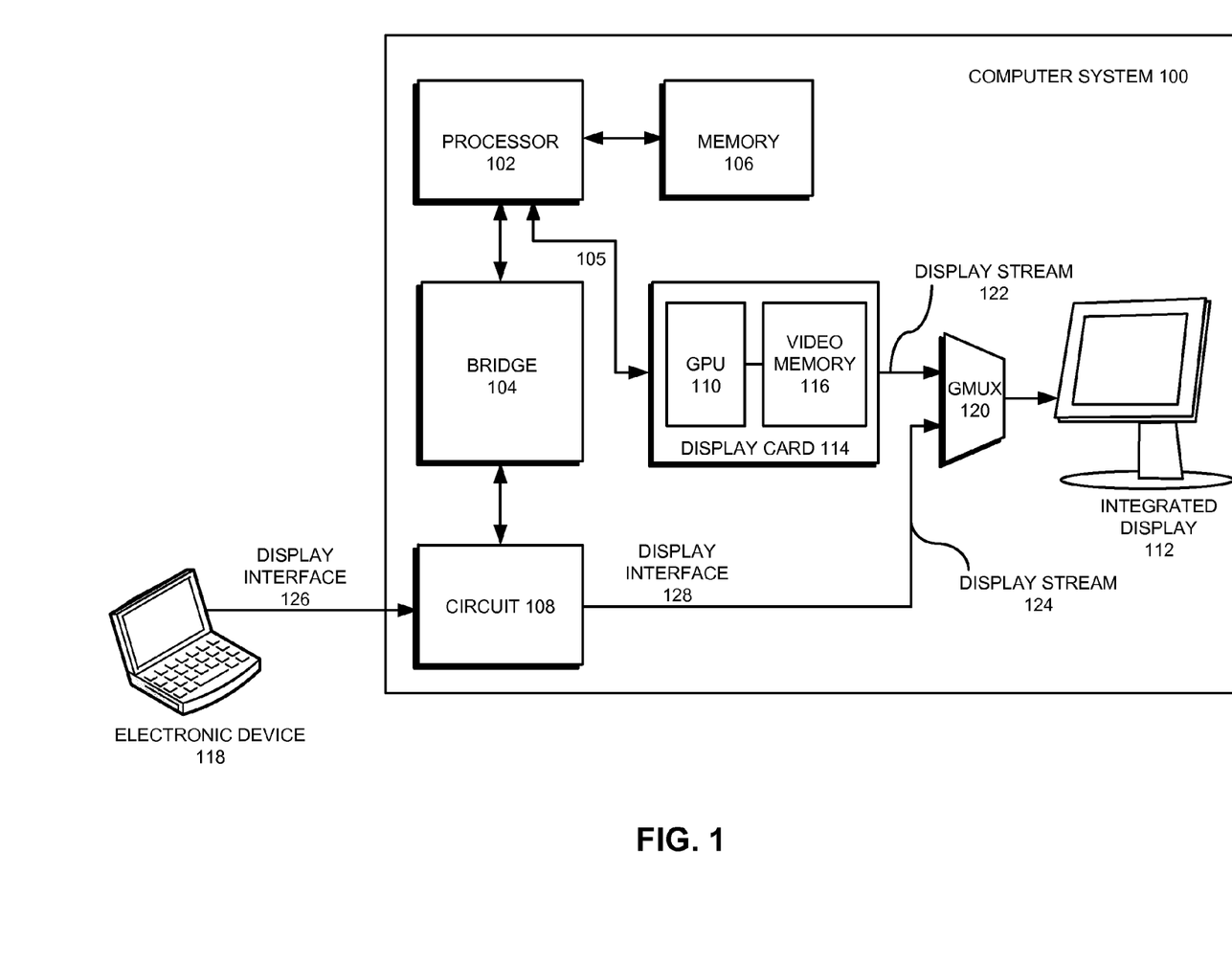
FIG. 1 shows the driving of an integrated display on a computer system from an electronic device in accordance with the disclosed embodiments.

FIG. 1 shows the driving of an integrated display 112 on a computer system 100 from an electronic device 118 in accordance with the disclosed embodiments. Electronic device 118 may be a laptop computer, personal computer, portable electronic device, and/or other device with functionality to drive an external display. Computer system 100 may correspond to an all-in-one desktop computer such as an iMac (iMac™ is a registered trademark of Apple Inc.) and/or another computer system with an integrated display (e.g., integrated display 112).

As shown in FIG. 1, computer system 100 includes a processor 102 that is coupled to a bridge chip 104 (e.g., south-bridge, Platform Controller Hub (PCH), etc.) and a memory 106 subsystem containing semiconductor memory. In addition, processor 102 may communicate with integrated display 112 using a display card 114. More specifically, processor 102 is coupled to display card 114 through an interface 105 such as Peripheral Component Interconnect Express (PCIe).

Display card 114 includes a graphics-processing unit (GPU) 110 that performs various graphical processing operations to produce video frames in one or more framebuffers located in video memory 116. The video frames may then be used to produce a display stream 122 that drives integrated display 112.

Moreover, a second display stream 124 for driving integrated display 112 may be generated by electronic device 118 and transmitted to computer system 100 over a display interface 126 such as Digital Visual Interface (DVI), High-Definition Multimedia Interface (HDMI), and/or DisplayPort. A circuit 108 on computer system 100, such as an interface controller for display interface 126, may receive display stream 124 and feed display stream 124 over a second display interface 128 into a data input of a graphics multiplexer (GMUX) 120. The graphics source driving integrated display 112 may then be determined by GMUX 120, which selects between GPU 110 and electronic device 118. For example, GMUX 120 may use display stream 122 to drive integrated display 112 if display stream 124 is not available (e.g., when electronic device 118 is not coupled to computer system 100 via display interface 126). GMUX 120 may then use display stream 124 to drive integrated display 112 if display stream 124 is available (e.g., when electronic device 118 is coupled to computer system 100) and/or if a user of computer system 100 has selected electronic device 118 as the source for driving integrated display 112.

Those skilled in the art will appreciate that integrated display 112 may have limited configurability when driven from electronic device 118. In particular, display commands from electronic device 118 may not reach integrated display 112 because integrated display 112 is configured as a sink for display commands from processor 102 and/or another component of computer system 100 (e.g., to enable normal use of computer system 100). Consequently, a user of electronic device 118 may be unable to control the brightness, volume, balance, muting, and/or blanking of integrated display 112 during use of integrated display 112 as an external display of electronic device 118.

In one or more embodiments, computer system 100 includes functionality to enable display commands from electronic device 118 to reach integrated display 112. As with display stream 124, each display command may be sent from electronic device 118 to circuit 108 over display interface 126. However, instead of transmitting the display command over display interface 128, a driver for circuit 108 may analyze the display command for compatibility with an application executing on processor 102. If the display command is compatible with the application, the driver may place the display command into memory 106. The application may then obtain the display command from memory 106 and process the display command to control a capability of integrated display 112. In other words, the application and driver may intercept display commands sent from electronic device 118 to integrated display 112 and enable the functionality associated with the display commands within computer system 100 without requiring changes to the architecture of computer system 100.

Figure 2:
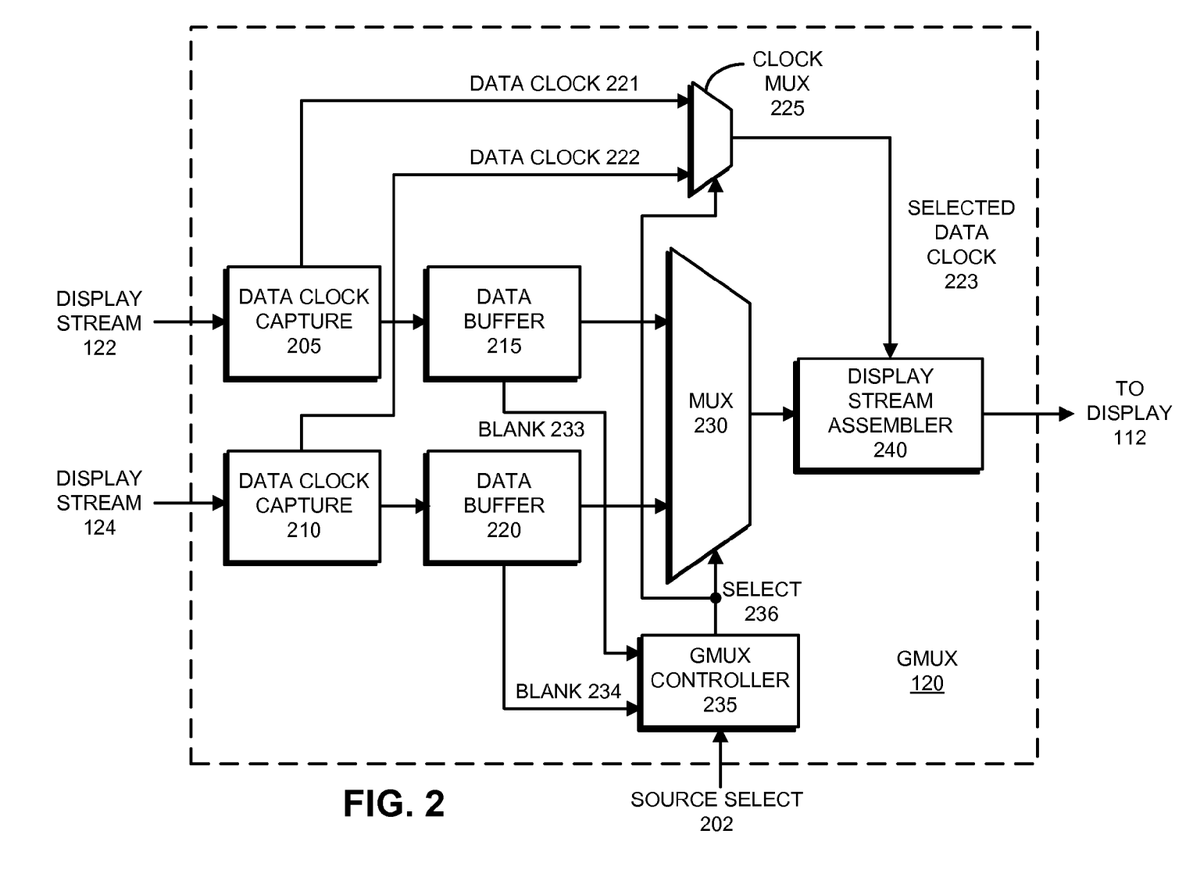
FIG. 2 illustrates the structure of a graphics multiplexer in accordance with the disclosed embodiments.

FIG. 2 illustrates the internal structure of the graphics multiplexer 120 (described above with reference to FIG. 1) in accordance with the disclosed embodiments. Referring to FIG. 2, display stream 122 from GPU 110 and display stream 124 from electronic device 118 feed into data clock capture blocks 205 and 210, respectively. Data clock capture blocks 205 and 210 de-serialize display streams 122 and 124 and also extract respective data clock signals 221 and 222.

Source select signal 202 feeds into a select input of GMUX 120 and determines which one of the two graphics sources will drive integrated display 112. (Note that other types of multiplexers can be used to select between graphics sources, such as a 2:1 DisplayPort multiplexer.) In the illustrated embodiment, source select signal 202 is produced by bridge chip 104, which includes specific logic for generating source select signal 202. (Note that source select signal 202 can also be produced by a logic block other than bridge chip 104.) The display stream from the selected graphics source then feeds into integrated display 112.

Data clock signals 221 and 222 feed into clock MUX 225, which selects one of data clock signals 221 and 222 to be forwarded to display stream assembler 240. In one embodiment, GMUX controller 235 provides select signal 236 to clock MUX 225. Alternatively, select signal 236 can be provided by other sources, such as processor 102 or another controller.

Next, display streams 122 and 124, with data clocks separated, feed into data buffers 215 and 220, respectively. Data buffers 215 and 220 examine display streams 122 and 124 to determine when blanking intervals occur, and produce respective blanking interval signals 233 and 234. Data buffers 215 and 220 also produce output data streams that feed into data MUX 230.

Blanking interval signals 233 and 234 feed into GMUX controller 235, which compares blanking intervals 233 and 234 to determine how much overlap, if any, exists between the blanking intervals of display streams 122 and 124. (Note that blanking interval signals 233 and 234 can indicate vertical or horizontal blanking intervals.) If GMUX controller 235 determines that blanking intervals 233 and 234 have a sufficient amount of overlap, GMUX controller 235 asserts select signal 236 as the blanking intervals begin to overlap. This causes clock MUX 225 and data MUX 230 to switch between display streams 122 and 124 during the period when their blanking intervals overlap. Because the switching occurs during the blanking intervals, the switching process will not be visible on integrated display 112.

Finally, the output of data MUX 230 and the selected data clock 223 feed into display stream assembler 240, which re-serializes the data stream before sending the data stream to integrated display 112.

Figure 3:
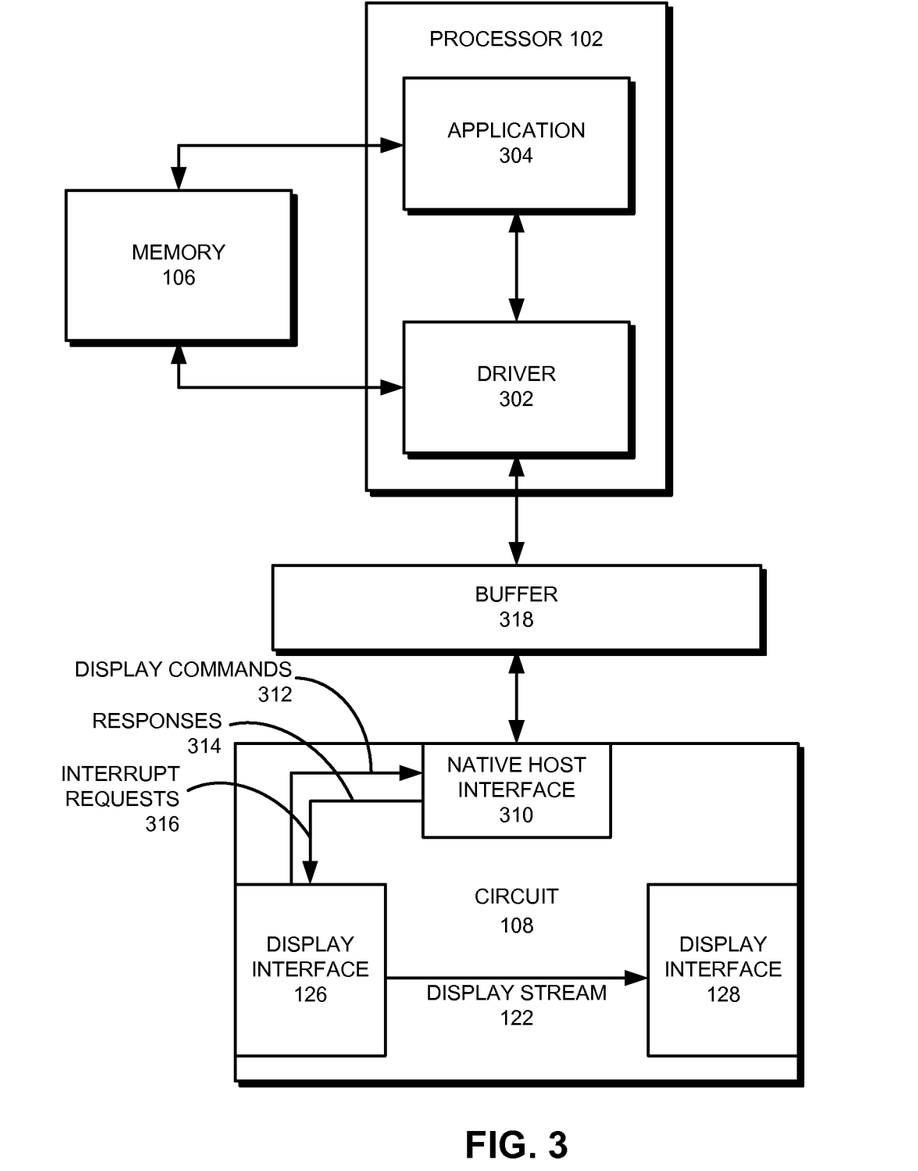
FIG. 3 shows the schematic of a system in accordance with the disclosed embodiments.

FIG. 3 shows the schematic of a system in accordance with the disclosed embodiments. As described above, the system may enable display commands from an electronic device (e.g., electronic device 118 of FIG. 1) to an integrated display (e.g., integrated display 112 of FIG. 1) on a computer system (e.g., computer system 100 of FIG. 1). The system of FIG. 3 includes circuit 108, a driver 302 executing on processor 102, and an application 304 executing on processor 102. Each of these components is described in further detail below.

Circuit 108 may include functionality to drive the integrated display using a display stream (e.g., containing video and/or audio data) from the electronic device. As shown in FIG. 3, circuit 108 may receive the display stream through a first display interface 126 with the electronic device and transmit the display stream to the integrated display using a second display interface 128 with the integrated display. For example, circuit 108 may correspond to an interface controller for a DisplayPort and/or Thunderbolt (Thunderbolt™ is a registered trademark of Apple Inc.) interface that connects the electronic device to the integrated display.

Circuit 108 may also receive display commands 312 from the electronic device to the integrated display (e.g., through an auxiliary channel of display interface 126). Display commands 312 may be used to control one or more capabilities of the integrated display, such as the brightness, volume, balance (e.g., audio balance), muting (e.g., audio muting), and/or blanking of the integrated display. In addition, display commands 312 may include start commands, write commands, read commands, and/or stop commands. For example, write commands may be used to adjust the capabilities of the integrated display, while read commands may be used to obtain the current state of the integrated display and/or current levels of the integrated display's brightness, volume, balance, muting, and/or blanking However, circuit 108 may not transmit display commands 312 to the integrated display through display interface 128 because the integrated display is configured as a sink for display commands from the computer system, and thus cannot accept display commands 312 from the electronic device. Instead, circuit 108 may use a native host interface 310 with the computer system to place each display command received over display interface 126 in a buffer 318.

Next, driver 302 may analyze the buffered display command for compatibility with application 304. If the display command is compatible with application 304, driver 302 may place the display command into memory 106 on the computer system by using direct memory access (DMA) to transfer the display command from buffer 318 to memory 106. Application 304 may then obtain the display command from memory 106 and process the display command to control a capability of the integrated display.

For example, circuit 108 may receive a write command for controlling the brightness of the integrated display over an auxiliary channel of display interface 126 and use native host interface 310 to place the write command into buffer 318. Driver 302 may examine an operation code (opcode) and/or a memory address in the write command to ensure that the write command can be understood by application 304. If the write command can be processed by the application, driver 302 may use a PCIe interface to place the write command directly into memory 106. Once the write command is in memory 106, application 304 may process the write command by routing the write command to the integrated display and/or making system calls that produce the effect of the write command in the integrated display.

To further facilitate interaction between the electronic device and the integrated display, application 304 may send communications associated with the integrated display to circuit 108 through driver 302, and circuit 108 may transmit the communications to the electronic device through display interface 126. As shown in FIG. 3, the communications may include responses 314 to display commands 312 and/or interrupt requests 316. Responses 314 may include acknowledgements of display commands 312 and/or data requested by the electronic device through display commands 312, and interrupt requests 316 may correspond to Hot Plug Detect (HPD) interrupts used to synchronize data between the electronic device and the integrated display.

In one or more embodiments, responses 314 and/or interrupt requests 316 are generated by application 304. For example, application 304 may generate an acknowledgement of a start command from the electronic device without forwarding the start command to the integrated display. Similarly, application 304 may generate an HPD interrupt to synchronize data with the electronic device without obtaining input from the integrated display.

On the other hand, communications that require data from the integrated display may be generated, in whole or in part, by the integrated display. For example, application 304 may forward a read command containing a read request to the integrated display if application 304 does not have access to some or all of the requested data. After application 304 receives a response containing the missing data from the integrated display, application 304 may store the response in memory 106, and driver 302 may transfer the response to buffer 318. Circuit 108 may then use native host interface 310 to obtain the response from buffer 318 and send the response to the electronic device over display interface 126. Processing of display commands and transmission of communications associated with the integrated display to the electronic device are described in further detail below with respect to FIGS. 4-5.

In other words, two-way communication between the electronic device and the integrated display may be enabled by routing display commands 312, responses 314, and/or interrupt requests 316 among the electronic device, application 304, and/or the integrated display. For example, application 304 may transmit an HPD interrupt request to the electronic device to initiate synchronization of data between the electronic device and the integrated display. In response to the HPD interrupt request, the electronic device may perform a read of a mailbox register in the integrated display, followed by a read of other registers in the integrated display specified in the mailbox register. To expedite completion of the reads, application 304 may preload the value of the mailbox register into memory 106 and send the value to the electronic device after receiving a read command for the mailbox register from the electronic device. Application 304 may also preload the values of other registers specified in the mailbox register into memory 106 to enable the generation of responses to subsequent read commands for the registers without forwarding the read commands to and obtaining responses to the read commands from the integrated display. On the other hand, application 304 may reduce complexity associated with mirroring registers in the integrated display to memory 106 by forwarding all read requests and/or commands from the electronic device to the integrated display and forwarding responses to the read requests and/or commands from the integrated display to the electronic device.

Consequently, the system of FIG. 3 may enable display commands from the electronic device to the integrated display, even if the integrated display is not configured to accept display commands from the electronic device. In particular, circuit 108, driver 302, and/or application 304 may be interposed between the electronic device and integrated display such that display commands received over display interface 126 are intercepted and redirected to the integrated display from within the computer system rather than transmitted to the integrated display over display interface 128. The system of FIG. 3 may additionally reduce latency associated with communication between the electronic device and the integrated display by using application 304 to generate some or all responses 314 and/or interrupt requests 316 in lieu of forwarding all display commands 312 to the integrated display and obtaining all responses 314 and/or interrupt requests 316 from the integrated display.

Those skilled in the art will appreciate that the system of FIG. 3 may be implemented in a variety of ways. First, circuit 108 may correspond to an interface controller that receives and processes all traffic between the electronic device and the integrated display, or circuit 108 may correspond to a microprocessor that processes only display commands 312, responses 314, and/or interrupt requests 316 between the electronic device and the integrated display. Along the same lines, driver 302 and application 304 may execute on the same processor 102, different processors, and/or different processor cores of the computer system.

Finally, the system of FIG. 3 may be configured to intercept and process various display commands supported by the integrated display, including display commands related to table reads and/or writes, retrieval of supported capabilities from the integrated display, short-pulse HPD, and/or vendor-private data channels between the electronic device and the integrated display. Moreover, application 304 may implement different policies related to the processing of various display commands and the subsequent control of the integrated display's capabilities based on the display commands. For example, application 304 may implement a policy that enables brightness, volume, muting, and/or balance controls for the electronic device but restricts the use of blanking and/or muting controls from the electronic device to the integrated display.

Figure 4:
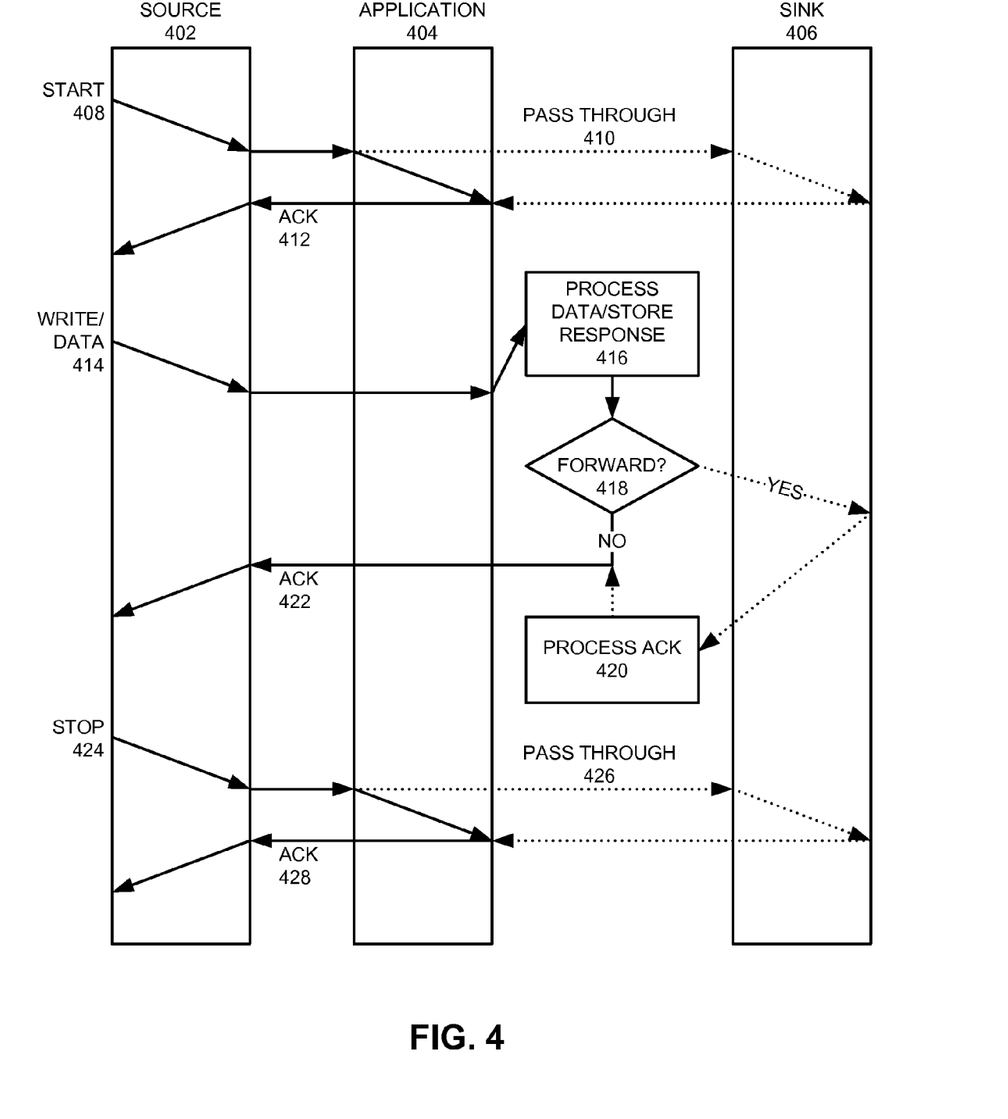
FIG. 4 shows a write transaction between an electronic device and an integrated display on a computer system in accordance with the disclosed embodiments.

FIG. 4 shows a write transaction between an electronic device and an integrated display on a computer system in accordance with the disclosed embodiments. Each display command associated with the write transaction may be generated by a source 402 on the electronic device and intercepted by an application 404. Application 404 may then process the display command and send a response to the display command, or application 404 may forward the display command to a sink 406 on the integrated display and obtain the response from sink 406.

In particular, the write transaction may begin with a start command (START) 408 from source 402. START 408 may be received by application 404 as a packet over a display interface with source 402. Next, application 404 may perform a pass through 410 of START 408 to sink 406, where an acknowledgement (ACK) 412 is generated by sink 406 and sent back to source 402 via application 404. Alternatively, application 404 may generate ACK 412 and transmit ACK 412 to source 402 without forwarding START 408 to sink 406. For example, application 404 may forgo and/or delay pass through 410 if processing of display commands by sink 406 is associated with a high latency and/or if application 404 does not require data from sink 406 to generate acknowledgement 412.

Next, source 402 may send a write command and/or data (WRITE/DATA) 414 associated with the write command to application 404. Application 404 may process the data and store the response 416 and/or forward 418 WRITE/DATA 414 to sink 406 for processing by sink 406. For example, application 404 may forward WRITE/DATA 414 to sink 406 if WRITE/DATA 414 is used to control the brightness, volume, balance, muting, and/or blanking of the integrated display. Furthermore, if WRITE/DATA 414 corresponds to a read request, application 404 may store a response to the read request for subsequent transmission to sink 406 upon receiving a read command from sink 406, as discussed in further detail below with respect to FIG. 5.

If WRITE/DATA 414 is forwarded to sink 406, application 404 may process an ACK 420 of the write command from sink 406 and transmit ACK 422 to source 402. Alternatively, application 404 may transmit ACK 422 to source 402 without obtaining and/or processing an ACK from sink 406.

Finally, source 402 may transmit a stop command (STOP) 424. As with START 408, application 404 may perform a pass through 426 of STOP 424 to sink 406 and receive an ACK 428 of STOP 424 from sink 406 before transmitting ACK 428 to source 402, or application 404 may generate and transmit ACK 428 without forwarding STOP 424 to sink 406.

Figure 5:
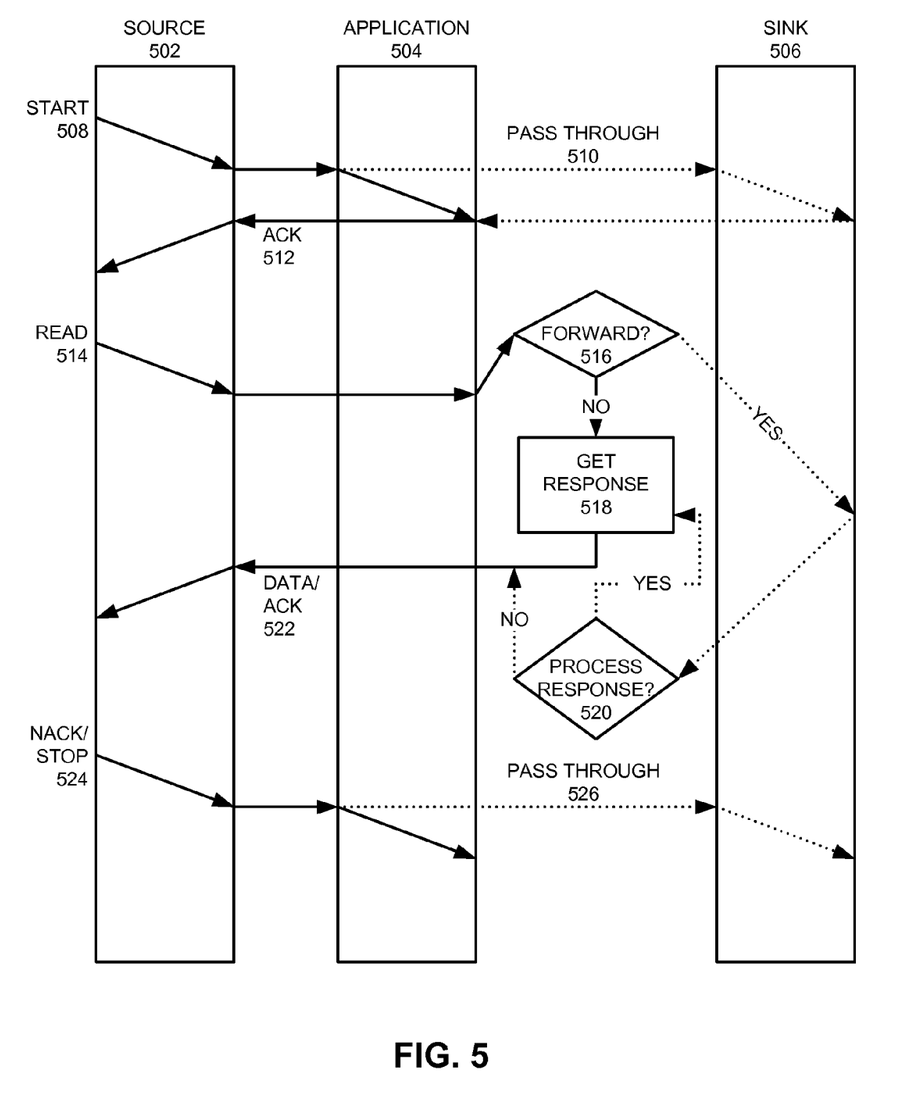
FIG. 5 shows a read transaction between an electronic device and an integrated display on a computer system in accordance with the disclosed embodiments.

FIG. 5 shows a read transaction between an electronic device and an integrated display on a computer system in accordance with the disclosed embodiments. As with the write transaction of FIG. 4, the read transaction may occur between a source 502 on the electronic device and a sink 506 on the integrated display and be mediated by an application 504 on the computer system. Moreover, the read transaction of FIG. 5 may be preceded by a write transaction that corresponds to a read request by source 502. For example, the read transaction may follow a read request for the current state (e.g., brightness, volume, balance, muting, blanking) and/or capabilities of the integrated display. As a result, the operations of FIG. 5 may be performed after the operations of FIG. 4 have completed.

First, a start command (START) 508 may be transmitted to application 504 from source 502. Application 504 may process START 508 and transmit an acknowledgement (ACK) 512 of START 508 to source 502, or application 504 may perform a pass through 510 of START 508 to sink 506 and obtain ACK 512 from sink 506 prior to transmitting ACK 512 to source 502.

Next, application 504 may intercept a read command (READ) 514 from source 502 to sink 506 and process and/or forward 516 READ 514 based on the availability of data related to READ 514 in application 504 and/or sink 506. If the data is accessible by application 504 and/or previously obtained from sink 506 by application 504 (e.g., after obtaining a write command representing a read request), application 504 may obtain a response 518 to READ 514 without forwarding READ 514 to sink 506 and/or waiting for a response from sink 506. Application 504 may then transmit the response in the form of data and/or an acknowledgement (DATA/ACK) 522 to source 502. On the other hand, if application 504 does not have some or all of the data related to READ 514, application 504 may forward READ 514 to sink 506 and obtain the missing data from sink 506 by processing a response 520 from sink 506 and including the missing data in DATA/ACK 522.

Finally, source 502 may transmit a negative acknowledgement or stop (NACK/STOP) 524 to application 504, and application 504 may optionally perform a pass through 526 of NACK/STOP 524 to sink 506. For example, source 502 may transmit a STOP if data requested by the read transaction has been received in full by source 502 and a NACK if one or more packets in DATA/ACK 522 are corrupted and/or missing.

Figure 6:
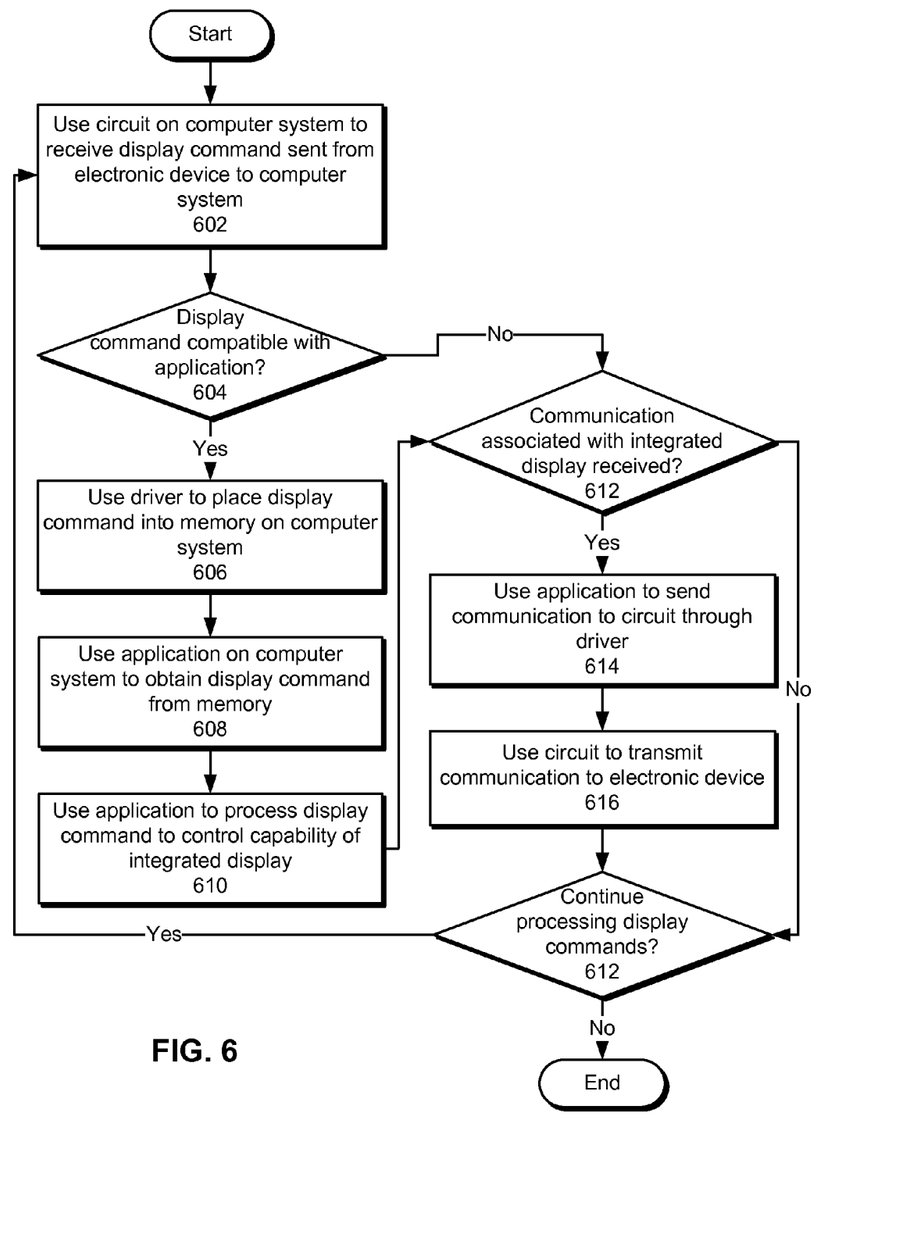
FIG. 6 shows a flowchart illustrating the process of driving an integrated display on a computer system from an electronic device in accordance with the disclosed embodiments.

FIG. 6 shows a flowchart illustrating the process of driving an integrated display on a computer system from an electronic device in accordance with the disclosed embodiments. In one or more embodiments, one or more of the steps may be omitted, repeated, and/or performed in a different order. Accordingly, the specific arrangement of steps shown in FIG. 6 should not be construed as limiting the scope of the embodiments.

Initially, a circuit on the computer system is used to receive a display command sent from the electronic device to the computer system (operation 602). The circuit may correspond to a microprocessor and/or an interface controller for a display interface connecting the electronic device and computer system. The display command may correspond to a start command, a write command, a read command, and/or a stop command.

The display command may be analyzed for compatibility with an application (operation 604) on the computer system. For example, the display command may be determined to be compatible with the application if the opcode (e.g., standard opcode, vendor-specific opcode) and/or memory address in the display command are understandable by the application and incompatible otherwise. If the display command is not compatible with the application, the display command is not processed in the computer system.

If the display command is compatible with the application, a driver in the computer system is used to place the display command into memory on the computer system (operation 606). To place the display command into the memory, the display command may be placed into a buffer (e.g., using a native host interface with the circuit), and DMA may be used to transfer the display command from the buffer to the memory.

Next, an application on the computer system is used to obtain the display command from the memory (operation 608) and process the display command to control a capability of the integrated display (operation 610). For example, the application may modify the brightness, volume, balance, muting, and/or blanking of the integrated display by routing the display command to the integrated display within the computer system and/or making system calls to produce the effect associated with the display command in the integrated display.

A communication associated with the integrated display may also be received (operation 612). The communication may correspond to a response to the display command and/or an interrupt request (e.g., for synchronizing data between the electronic device and the integrated display). In addition, the communication may be generated by the application and/or integrated display. For example, a response to a read command may be generated by the application if data requested by the read command is accessible to the application. On the other hand, the response may be generated, in part or in whole, by the integrated display if the application lacks access to some or all of the requested data and/or a read request associated with the read command was previously forwarded to the integrated display by the application.

If a communication is received, the application is used to send the communication to the circuit through the driver (operation 614), and the circuit is used to transmit the communication to the electronic device (operation 616). In other words, the communication may be sent over the reverse path of the display command by the application, driver, and/or circuit. If no communication is received, no transmission from the application to the electronic device is made.

Processing of display commands from the electronic device to the integrated display may continue (operation 618). For example, processing of display commands may continue until the electronic device is no longer coupled to the integrated display. If processing of display commands is to continue, each display command is received by the circuit (operation 602), placed into memory on the computer system based on compatibility with the application (operations 604-606), and processed by the application (operations 608-610) to produce the desired effect in the integrated display. At the same time, each communication associated with the integrated display may be sent from the application to the electronic device (operations 612-616) through the driver and circuit to facilitate interaction between the electronic device and integrated display. Processing of display commands may thus continue until the electronic device is disconnected from the integrated display and/or display commands from the electronic device to the integrated display are disabled.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A system for driving an integrated display on a computer system from an electronic device, comprising:
   a circuit configured to receive a display command sent from the electronic device to the computer system, the display command configured to obtain a current state of the integrated display to be returned to the electronic device or adjust one or more capabilities of the integrated display as indicated by the electronic device;
   a processor;
   an application which executes on the processor and is configured to:
      obtain the display command from a memory on the computer system; and
      process the display command to obtain the current state of the integrated display or adjust the one or more capabilities of the integrated display; and
   a driver which executes on the processor and is configured to:
      analyze the display command for compatibility with the application; and
      if the display command is compatible with the application, place the display command into the memory.

2. The system of claim 1, wherein placing the display command into the memory involves:
   placing the display command into a buffer; and
   using direct memory access (DMA) to transfer the display command from the buffer to the memory.

3. The system of claim 1,
   wherein the application is further configured to send a communication associated with the integrated display to the circuit through the driver, and
   wherein the circuit is further configured to transmit the communication to the electronic device.

4. The system of claim 3, wherein the communication is at least one of a response to the display command and an interrupt request.

5. The system of claim 3, wherein the communication is generated by at least one of the application and the integrated display.

6. The system of claim 1, wherein processing the display command to control the capability of the integrated display involves at least one of:
forwarding the display command to the integrated display; and
generating a response to the display command.

7. The system of claim 1, wherein the display command is at least one of:
a write command for adjusting the one or more capabilities of the display, and
a read command for obtaining the current state of the display.

8. The system of claim 1, wherein the capability of the integrated display is at least one of a brightness, a volume, a balance, a muting, and a blanking.

9. A method for driving an integrated display on a computer system from an electronic device, comprising:
using a circuit on the computer system to receive a display command sent from the electronic device to the computer system, the display command configured to obtain a current state of the integrated display to be returned to the electronic device or adjust one or more capabilities of the integrated display as indicated by the electronic device;
analyzing the display command for compatibility with an application on the computer system; and
if the display command is compatible with the application, using a driver on the computer system to place the display command into the memory;
using the application to:
obtain the display command from a memory on the computer system; and
process the display command to obtain the current state of the integrated display or adjust the one or more capabilities of the integrated display.

10. The method of claim 9, wherein placing the display command into the memory involves:
placing the display command into a buffer; and
using direct memory access (DMA) to transfer the display command from the buffer to the memory.

11. The method of claim 9, further comprising:
using the application to send a communication associated with the integrated display to the circuit through the driver; and
using the circuit to transmit the communication to the electronic device.

12. The method of claim 11, wherein the communication is at least one of a response to the display command and an interrupt request.

13. The method of claim 9, wherein processing the display command to control the capability of the integrated display involves at least one of:
forwarding the display command to the integrated display; and
generating a response to the display command.

14. The method of claim 9, wherein the display command is at least one of:
a write command for adjusting the one or more capabilities of the integrated display, and
a read command for obtaining the current state of the integrated display.

15. The method of claim 9, wherein the capability of the integrated display is at least one of a brightness, a volume, a balance, a muting, and a blanking.

16. A computer system, comprising:
a processor;
a memory;
an integrated display;
a circuit configured to receive a display command sent from an electronic device to the computer system, the display command configured to obtain a current state of the integrated display to be returned to the electronic device or adjust one or more capabilities of the integrated display as indicated by the electronic device; and
an application which executes on the processor and is configured to:
obtain the display command from the memory; and
process the display command to obtain the current state of the integrated display or adjust the one or more capabilities of the integrated display; and
a driver configured to:
analyze the display command for compatibility with the application; and
if the display command is compatible with the application, place the display command into the memory.

17. The computer system of claim 16, wherein placing the display command into the memory involves:
placing the display command into a buffer; and
using direct memory access (DMA) to transfer the display command from the buffer to the memory.

18. The computer system of claim 16,
wherein the application is further configured to send a communication associated with the integrated display to the circuit through the driver, and
wherein the circuit is further configured to transmit the communication to the electronic device.

19. The computer system of claim 18, wherein the communication is at least one of a response to the display command and an interrupt request.

20. The computer system of claim 18, wherein the communication is generated by at least one of the application and the integrated display.

21. The computer system of claim 18, wherein the display command is at least one of:
a write command for adjusting the one or more capabilities of the integrated display, and
a read command for obtaining the current state of the integrated display.

22. The computer system of claim 16, wherein the capability of the integrated display is at least one of a brightness, a volume, a balance, a muting, and a blanking.

23. The computer system of claim 16, wherein the circuit is at least one of a microprocessor and an interface controller.

* * * * *